United States Patent
Schumacher et al.

(10) Patent No.: US 12,120,518 B2
(45) Date of Patent: Oct. 15, 2024

(54) CRYPTOGRAPHIC IDENTIFICATION OF FALSE BASE STATIONS

(71) Applicant: T-Mobile Innovations LLC, Overland Park, KS (US)

(72) Inventors: Gregory Schumacher, Holliston, MA (US); Marouane Balmakhtar, Fairfax, VA (US); Geoffrey Todd Gibson, Dallas, TX (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 492 days.

(21) Appl. No.: 17/559,039

(22) Filed: Dec. 22, 2021

(65) Prior Publication Data

US 2023/0199498 A1    Jun. 22, 2023

(51) Int. Cl.
*H04W 12/122*  (2021.01)
*H04W 12/03*   (2021.01)
*H04W 12/0431* (2021.01)
*H04W 12/106*  (2021.01)
*H04W 12/73*   (2021.01)

(52) U.S. Cl.
CPC ......... *H04W 12/122* (2021.01); *H04W 12/03* (2021.01); *H04W 12/0431* (2021.01); *H04W 12/106* (2021.01); *H04W 12/73* (2021.01)

(58) Field of Classification Search
CPC . H04W 12/122; H04W 12/06; H04W 12/106; H04W 12/108; H04W 12/03; H04W 12/069; H04W 12/71; H04L 9/3247; H04L 2209/80

See application file for complete search history.

(56) References Cited

U.S. PATENT DOCUMENTS

| | | | | |
|---|---|---|---|---|
| 7,533,267 B2 * | 5/2009 | Yoshimura | ......... | H04N 1/32101 713/180 |
| 7,600,129 B2 * | 10/2009 | Libin | .................... | H04L 9/3234 380/278 |
| 8,392,713 B2 * | 3/2013 | Hughes | ................. | H04L 9/3247 726/28 |

(Continued)

FOREIGN PATENT DOCUMENTS

| | | | | |
|---|---|---|---|---|
| EP | 3979683 A1 * | 4/2022 | ......... | H04L 63/0823 |
| EP | 4106376 A1 * | 12/2022 | ............ | H04W 12/06 |

(Continued)

*Primary Examiner* — Lizbeth Torres-Diaz
(74) *Attorney, Agent, or Firm* — Shook, Hardy & Bacon L.L.P.; Elena K. McFarland

(57) ABSTRACT

Methods and systems for detecting false base stations are provided. A computing device transmits a request for a verification message to a base station. An encrypted verification message comprising a base station identifier and a signature encrypted using an encryption key associated with the base station is received by the computing device. The computing device decrypts the signature included in the encrypted verification message utilizing a decryption key associated with the computer system. Based on the decrypted signature, the computing device determines that the encryption key does not correspond to the decryption key. Based on determining that the encryption key does not correspond to the decryption key, the computing device stores the base station identifier in a data store in association with a false base station indicator.

20 Claims, 4 Drawing Sheets

(56) References Cited

U.S. PATENT DOCUMENTS

| | | | | |
|---|---|---|---|---|
| 8,954,735 | B2* | 2/2015 | Smith | H04L 9/0866 |
| | | | | 713/184 |
| 10,200,869 | B2* | 2/2019 | Norrman | H04W 12/12 |
| 10,887,089 | B2* | 1/2021 | Torvinen | H04W 12/033 |
| 11,265,170 | B2* | 3/2022 | Takemori | G07C 5/085 |
| 11,657,136 | B2* | 5/2023 | Meier | H04L 63/0407 |
| | | | | 726/8 |
| 11,950,320 | B2* | 4/2024 | Lim | H04L 63/20 |
| 2002/0169971 | A1* | 11/2002 | Asano | G11B 20/0021 |
| | | | | 713/168 |
| 2009/0271321 | A1* | 10/2009 | Stafford | H04L 63/062 |
| | | | | 713/168 |
| 2010/0174911 | A1* | 7/2010 | Isshiki | H04L 9/3257 |
| | | | | 713/182 |
| 2012/0230488 | A1* | 9/2012 | De Los Reyes | H04W 12/069 |
| | | | | 380/247 |
| 2015/0341331 | A1* | 11/2015 | Weksler | H04L 63/1433 |
| | | | | 726/4 |
| 2016/0036586 | A1* | 2/2016 | Murakami | H04L 9/14 |
| | | | | 380/270 |
| 2021/0377726 | A1* | 12/2021 | Finney | H04W 12/71 |
| 2022/0060901 | A1* | 2/2022 | Rajendran | H04W 36/0088 |
| 2023/0198780 | A1* | 6/2023 | Schneider | H04L 9/3263 |
| | | | | 713/175 |

FOREIGN PATENT DOCUMENTS

| | | | | |
|---|---|---|---|---|
| WO | WO-2014142719 A1 * | 9/2014 | | G07B 15/063 |
| WO | WO-2021096719 A1 * | 5/2021 | | H04L 27/261 |
| WO | WO-2021126383 A1 * | 6/2021 | | G01S 5/021 |
| WO | WO-2024025375 A1 * | 2/2024 | | H04W 12/06 |

* cited by examiner

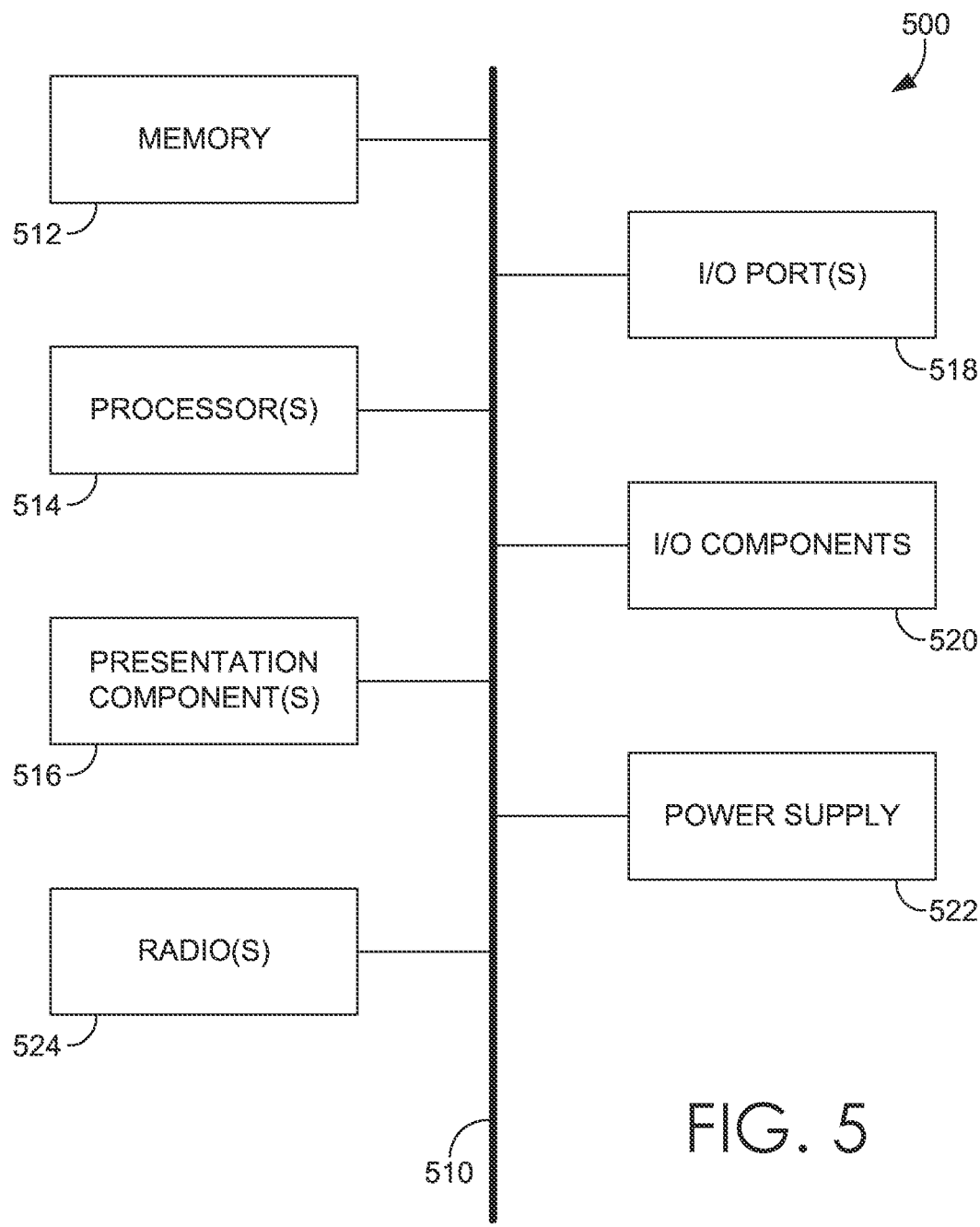

CRYPTOGRAPHIC IDENTIFICATION OF FALSE BASE STATIONS

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

One aspect of the present disclosure relates to a computer-implemented method for detecting false base stations. In embodiments, a request for a verification message is transmitted by a computing device to a base station. The computing device receives an encrypted verification message from the base station comprising a base station identifier and a signature encrypted utilizing an encryption key associated with the base station. The signature included in the encrypted verification message is then decrypted by the computing device utilizing a decryption key associated with the computing system. Based on the decrypted signature, the computing device determines that the encryption key does not correspond to the decryption key. Based on determining that the encryption key does not correspond to the decryption key, the base station identifier is stored by the computing device, in a data store in association with a false base station indicator.

Another aspect of the present disclosure relates to a false base station identification system comprising one or more processors and one or more computer storage media storing computer-useable instructions that, when used by the one or more processors, cause the one or more processors to receive, by a false base station identification system, a base station certification request from a user computing device, wherein the base station certification request comprises at least a base station identifier, and a base station signature encrypted utilizing an encryption key. The false base station identification system utilizes a decryption key associated with the false base station identification system to decrypt the base station signature. Based on decrypting the base station signature, the false base station identification system determines that a base station associated with the base station identifier is a false base station. The base station identifier is then stored, by the false base station identification system, in association with a false base station indicator in a data store.

Yet another aspect of the present disclosure relates to one or more non-transitory computer-readable media having computer-executable instructions embodied thereon that, when executed by a computing device, perform a method. This method comprises transmitting, by the computing device, a request for a verification message to a base station. The computing device then receives an encrypted verification message from the base station, the encrypted verification message comprising at least a base station identifier and a signature encrypted using an encryption key associated with the base station. The computing device decrypts the signature utilizing a decryption key associated with the computer system. Based on the decrypted signature, the computing device determines that the encryption key does correspond to the decryption key. Based on determining that the encryption key corresponds to the decryption key, the computing device stores the base station in a data store, wherein the base station identifier is stored in association with a real base station indicator.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present technology is described in detail herein with reference to the drawing figures, which are intended to be exemplary and non-limiting in nature, wherein:

FIG. 5 depicts an exemplary computing environment suitable for use in implementation of the present disclosure;

DETAILED DESCRIPTION

Figure 1:
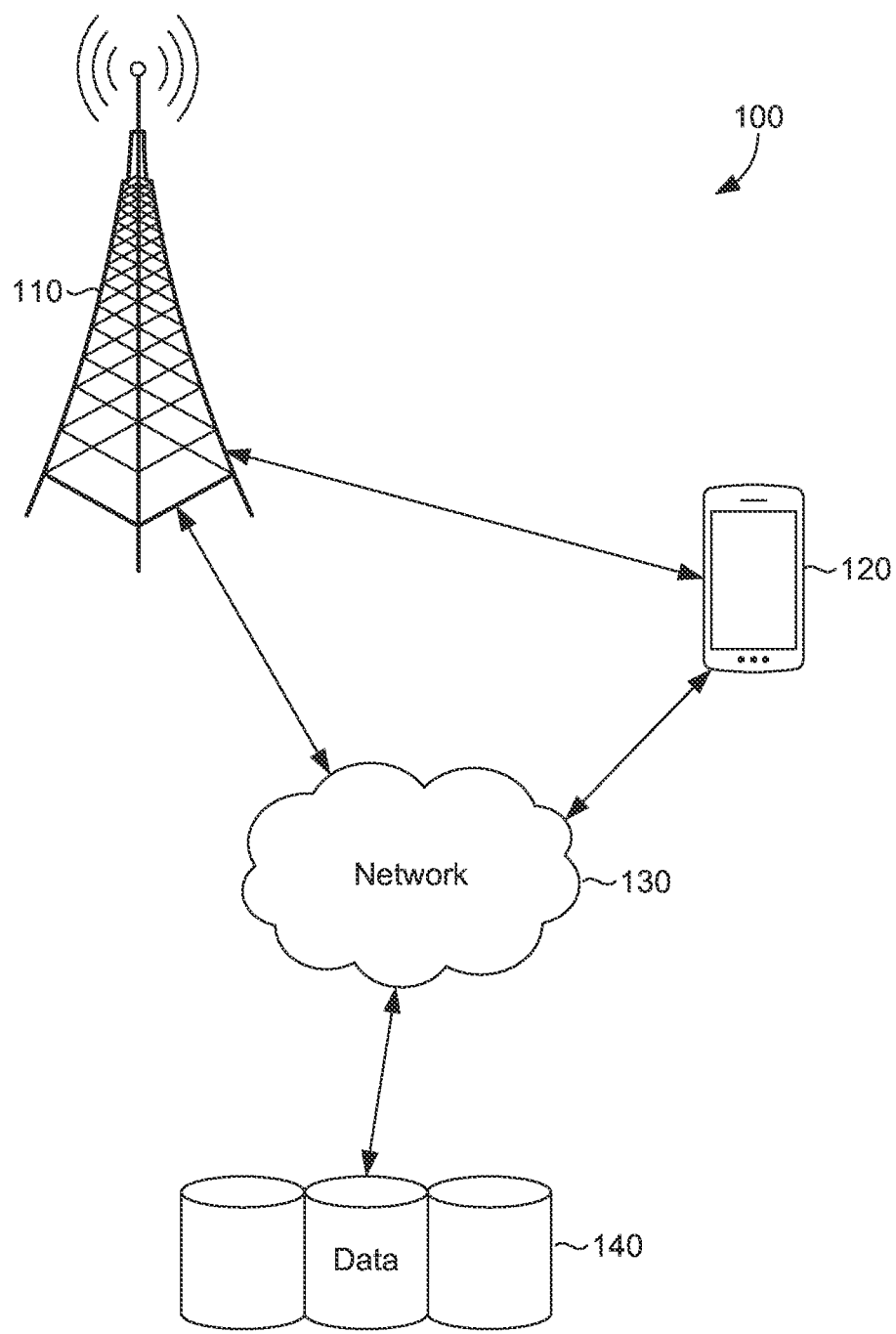
FIG. 1 illustrates a network environment in which implementations of the present disclosure may be employed.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations may be employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms 3G Third-Generation Wireless Technology
4G Fourth-Generation Cellular Communication System
5G Fifth-Generation Wireless Technology
CD-ROM Compact Disk Read Only Memory
CDMA Code Division Multiple Access
eNodeB Evolved Node B
gNodeB 5G Node B
GIS Geographic/Geographical/Geospatial Information System
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode LTE Long Term Evolution
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
UMTS Universal Mobile Telecommunications Systems Further, various technical terms are used throughout this description. An illustrative resource that describes these terms may be found in Newton's Telecom Dictionary, 31th Edition (2018).

A "mobile device," as used herein, is a device that has the capability of using a wireless communications network, and may also be referred to as a "user device," "wireless communication device," or "user equipment (UE)." A mobile device may take on a variety of forms, such as a personal computer (PC), a laptop computer, a tablet, a mobile phone, a personal digital assistant (PDA), a server, or any other device that is capable of communicating with other devices using a wireless communications network. Additionally, embodiments of the present technology may be used with different technologies or standards, including, but not limited to, CDMA 1XA, GPRS, EvDO, TDMA, GSM, WiMax technology, LTE, LTE Advanced, and/or 5G among other technologies and standards.

Embodiments of the technology may be embodied as, among other things, a method, a system, and/or a computer-program product. Accordingly, the embodiments may take the form of a hardware embodiment, or an embodiment combining software and hardware. In one embodiment, the technology may take the form of a computer-program product that includes computer-useable instructions embodied on one or more computer-readable media.

Computer-readable media may include both volatile media, non-volatile media, removable media, non-removable media, and contemplate media readable by a database, a switch, and/or various other network devices. Network switches, routers, and related components are conventional in nature, as are methods of communicating with the same. By way of example, and not limitation, computer-readable media may include computer storage media and/or communications media.

Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, and/or permanently.

Communications media typically store computer-useable instructions—including data structures and program modules—in a modulated data signal. The term "modulated data signal" refers to a propagated signal that has one or more of its characteristics set or changed to encode information in the signal. Communications media includes any information-delivery media. By way of example, but not limitation, communications media may include wired media, such as a wired network or direct-wired connection, and wireless media such as acoustic, infrared, radio, microwave, spread-spectrum, and other wireless media technologies. Combinations of the above are included within the scope of computer-readable media. Communications media do not include signals per se.

In brief, and at a high level, this disclosure describes, among other things, methods and systems for detecting false base stations, which include any network base stations which are not associated with a network, or that are actively attempting to disguise themselves as part of the network. These false base stations are detected by a system having a false base station identification function (FBSIF) associated with the network. In further embodiments, this FBSIF may be stored in a data store associated with the network.

False base stations may be used to impersonate the real base stations of a network and trick user devices into believing that they are legitimate. When undetected, false base stations can obtain a user device's identifiers through communicating with the user device. Using these identifiers, a false base station could track the user device's interactions and information. Additionally, these false base stations may be used to send fraudulent emergency notifications to user devices in the false base station's area. These fraudulent emergency messages can cause panic and harm to individuals who receive them.

Attempting to detect these false base stations by the individual user devices would be possible, but the process can consume valuable processing power and memory storage. Additionally, constantly trying to detect false base stations by the individual user devices would create a drain on the batteries of the user devices. In order to overcome these issues, the present disclosure utilizes a centralized False Base Station Identification Function (FBSIF), also referred to as a false base station identification system, to determine whether a base station is a false base station or a real base station. This centralized FBSIF takes the strain off of the individual user devices thereby conserving the precious processing power and battery life of the devices. The FBSIF can be a system associated with individual networks, or it can be associated with a plurality of networks of varying operators. As used herein, "operators" describes varying companies that provide cellular services, and may be used interchangeably with service provider. As will be discussed in detail below, the FBSIF can use various cryptography methods to determine whether a base station is a false base station or a real base station. This centralized system takes the potential drain off of the individual user devices therefore making the process more efficient than alternative methods. This increase in efficiency leads to longer battery life for user devices and increases the processing speed of false base station detection, by making the determination at a centralized system.

FIG. 1 provides an exemplary network environment in which implementations of the present disclosure may be employed. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

The network environment 100 includes user device 120, a node 110, a network 130, and a data store 140. In network environment 100, the user device 120 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 500) that wirelessly communicates with a node of the wireless network, such as the node 110, in order to interact with one or more components of the network 130. The user device 120 may be said to have a unique identifier, used to exclusively identify the user device (e.g., an Automatic Number Identifier (ANI) when it attempts to or actually connects to the one or more components of the network 130.

In some aspects, the user device 120 can include a computing device 500 in FIG. 5. Thus, a user device can include, for example, a display(s), a power source(s) (e.g., a battery), a data store(s), a speaker(s), memory, a buffer(s), a radio(s) and the like. In some implementations, the user device 120 comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network. Further, the user device 120 may communicate with the node 110 on any one or more frequencies, frequency bands, channels, or the like. Though only the node 110 is depicted in FIG. 1, it should be understood that the user device 120 may be capable of connecting to any one or more of a plurality of nodes, such as node 110, utilizing any one or more of a plurality of communication protocols, on any one or more of a plurality of frequencies.

In some cases, the user device 120 in network environment 100 can optionally utilize network 130 to communicate with other computing devices (e.g., a mobile device(s), a server(s), a personal computer(s), etc.) through the node 110. The network 130 may be a telecommunications network(s), or a portion thereof. A telecommunications network might include an array of devices or components (e.g., one or more base stations, servers, computer processing components), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network 130 can include multiple networks, as well as being a network of networks, but is shown in more simple form so as to not obscure other aspects of the present disclosure. For example, the network 130 may comprise a core network, which may further be said to comprise one or more components of a transport layer, control layer, and/or application layer. The network 130 may alternatively comprise an Internet Protocol Multimedia Service (IMS) core. The network 130 may comprise any one or more components, subcomponents, processors, engines, or the like, which perform functions for establishing a connection between the user device 120 and a destination. In aspects, the network 130 may comprise a Media Resource Function (MRF), which may be configured to receive a request or other indication from the user device 120 that the user device 120 is attempting to access a particular service and, in response to such a request, reply to the user device 120 with a prompt for additional information. The network 130 may comprise a call session control function (CSCF), such as a Proxy-CSCF (P-CSCF), which, when configured at or near the edge of the IMS core or network 130, handle Session Initial Protocol SIP signaling packets (e.g., SIP INVITE). Further, the network 130 may be said to comprise one or more application servers, which provide access to an application or service requested by the user device 120.

Network 130 may be part of a telecommunication network that connects subscribers to their service provider. In aspects, the service provider may be a telecommunications service provider, an internet service provider, or any other similar service provider that provides at least one of voice telecommunications and data services to any or all of the user device 120. For example, network 130 may be associated with a telecommunications provider that provides services (e.g., 5G) to the user device 120. Additionally or alternatively, network 130 may provide voice, SMS, and/or data services to user devices or corresponding users that are registered or subscribed to utilize the services provided by a telecommunications provider. Network 130 may comprise any communication network providing voice, SMS, and/or data service(s), using any one or more communication protocols, such as a 1× circuit voice, a 3G network (e.g., CDMA, CDMA2000, WCDMA, GSM, UMTS), a 4G network (WiMAX, LTE, HSDPA), or a 5G network. The network 130 may also be, in whole or in part, or have characteristics of, a self-optimizing network.

In aspects, the network 130 may comprise one or more components of a next generation radio access network (NG-RAN). In said aspects, the NG-RAN can be part of a telecommunication network that connects subscribers to their immediate service provider or one or more core networks. For example, the NG-RAN can be associated with a telecommunications provider that provides services (e.g., voice, data, SMS) to user devices, such as user device 120. For example, network 130 may provide voice, SMS, and/or data services to user devices or corresponding users that are registered or subscribed to utilize the services provided by a telecommunications provider. Accordingly, the network 130 may comprise any one or more communication networks providing voice, SMS, and/or data service(s), such as, for example, a 1×circuit voice, a 3G network (e.g., CDMA, CDMA2000, WCDMA, GSM, UMTS), a 4G network (WiMAX, LTE, HSDPA), a 5G network, or a PSTN.

In some implementations, the node 110 is configured to communicate with user devices, such as the user device 120 that are located within the geographical area, or cell, covered by the one or more antennas of the node 110. Said area may be referred to herein as a geographic coverage area, sector, or the like. Though referred to as a node for simplicity, the node 110 may include (or be communicatively coupled to) one or more base stations, nodes, base transmitter stations, radios, antennas, antenna arrays, power amplifiers, transmitters/receivers, digital signal processors, control electronics, GPS equipment, and the like. In particular, the node 110 may receive a variety of uplink signals from the user device 120 that include requests to access a particular application, service, object, or the like (e.g., an access-restricted telecommunication service). Though not specifically shown in FIG. 1, each node, such as the first none 110 may be a base station. As used herein, a base station refers to a fixed transceiver that is the serves as a communication point for one or more wireless mobile devices. Said base station, comprises at least one antenna used to transmit an RF signal. The at least one antenna may take many forms, such as a dipole, crossed dipole, monopole, spiral, helix, yagi-uda, or parabolic antenna, or any other antenna for communicating the RF signal from the base station to a user device within the base station's coverage area. In some aspects, the at least one antenna may be a plurality of antennas that are grouped together to form an array or node, such as an eNodeB, gNodeB, Multiple-Input and Multiple-Output (MIMO) array, or the like.

The requests to access a particular application, service, object, or the like may comprise one or more messages using a standardized protocol, such as the Session Initiation Protocol (SIP). SIP is a protocol that is used to establish, maintain, or terminate a session, such as a voice, data, video, or messaging function. As used herein, the term "SIP Invite" is used as a general term, comprising actual SIP Invite messaging according to SIP standards, that refers to a request from the user device 120 to one or more components of the network 130 to access a particular service, object, or the like. Further, As the backbone of the RAN, the node 110 facilitates the establishment and maintenance of a connection between the user device 120 and the network 130. Additionally, the node 110 may be configured to communicate with a False Base Station Identification Function (FBSIF). This FBSIF may be an independent system associated with the network 130. In embodiments, the FBSIF may be stored in a data store 140 associated with the network 130. Also, the network 130 may comprise or be communicatively coupled to the FBSIF that is utilized, in various implementations, to perform one or more methods for identifying false base stations.

Figure 2:
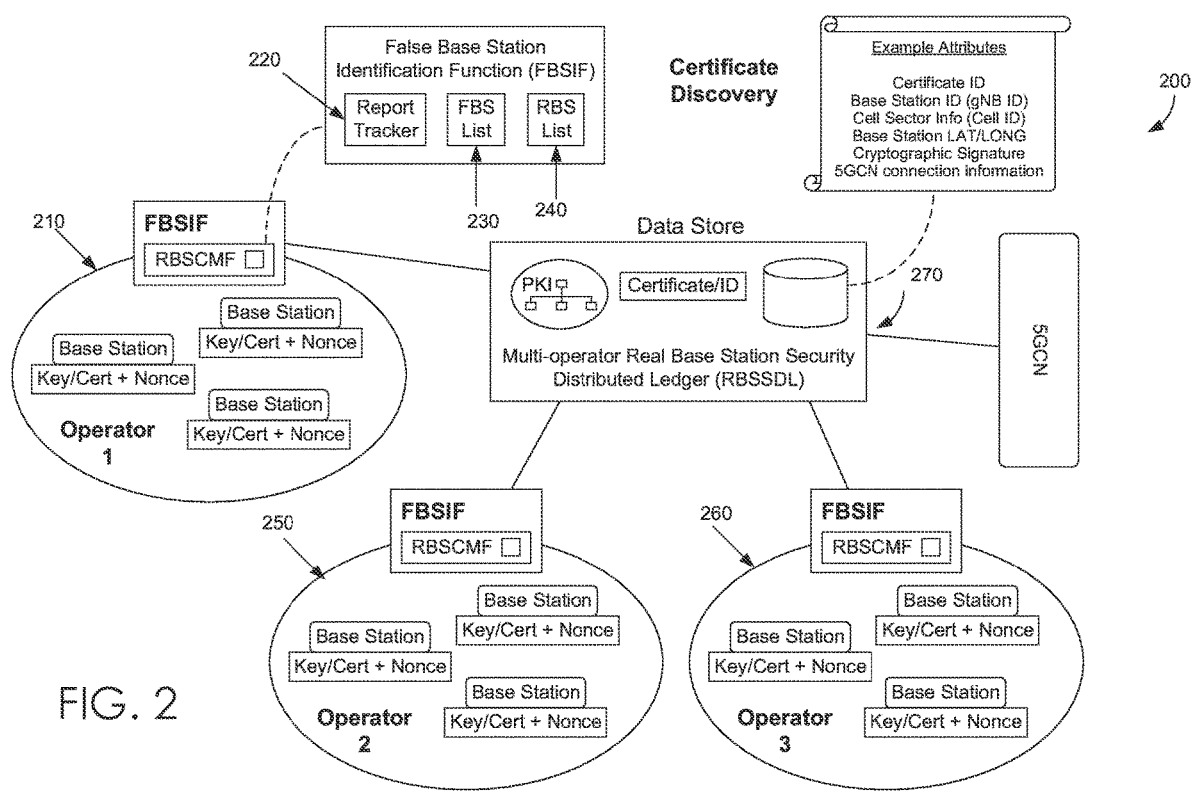
FIG. 2 illustrates an exemplary network environment in which implementations of the present disclosure may be employed across multiple providers.

Turning to FIG. 2, a multiple operator network environment 200 for identifying false base stations is illustrated. At a high level, the environment 200 comprises at least a first operator environment 210. This first operator environment 210 is comprised of at least one base station and an FBSIF. In embodiments, this FBSIF further comprises a Real Base Station Certificate Management Function (RBSCMF). This RBSCMF may be configured to store at least information related to user devices associated with the first operator environment 210, base stations associated with the first operator environment 210, as well as keys, certificates, and nonces associated with the base stations associated with the first operator environment 210. The RBSCMF additionally comprises a report tracker 220, an FBS List 230 (False Base Station List) and an RBS List 240 (Real Base Station List). The report tracker 220 is configured to store and track requests for base station verifications.

In embodiments, and as discussed in detail below, these requests for base station verification can be transmitted from the FBSIF to the base stations. In embodiments, these requests can also indicate a request for base station verification transmitted from a user device. These requests provided from a user device may, for example, be transmitted to the FBSIF at regular intervals, be transmitted upon request by the FBSIF, or may be transmitted based on a user device connecting with an unrecognized base station for the first time. Similarly, the requests transmitted from the FBSIF to the base stations may be transmitted, for example, at regular intervals or based on detecting the presence of an unrecognized base station. Each of these requests for verification is stored in the report tracker 220. Once a base station associated with a verification request has been decrypted and analyzed by the FBSIF, a base station identifier associated with the base station is stored in either the FBS List 230 or the RBS List 240.

If the decryption results in a conclusion that a base station is a real base station, the base station identifier associated with that base station is stored in the RBS List in association with a real base station indicator. If the decryption results in a conclusion that a base station is a fake base station, the base station identifier associated with that base station is stored in the FBS List in association with a false base station indicator. Additionally, the report tracker and the FBSIF may be configured to detect duplicate base stations. For example, if the FBSIF receives a request for verification associated with a base station, the FBSIF may first check the RBSCMF for previous instances of a base station identifier associated with the base station. If a previous instance of the base station identifier is discovered, then the FBSIF can remove the duplicate instance from the report tracker. This duplicate detection and removal allow the FBSIF to function efficiently and conserve processing power for the multitude of other requests for verification. Each of the second operator environment 250 and the third operator environment 260 may be configured similar to the first operator environment 210. In embodiments, each of the first operator environment 210, the second operator environment 250, and the third operator environment 260 may represent distinct services providers. For example, the first operator environment may be associated with a first service provider, and the second operator environment may be associated with a second service provider. In further embodiments, the first operator environment 210, the second operator environment 250, and the third operator environment 260 may represent geographic ranges associated with each FBSIF. In embodiments, these geographic ranges may be distinct ranges wherein only one FBSIF is associated with each base station within a particular geographic range. In additional embodiments, the geographic ranges may be overlapping ranges wherein multiple FBSIFs may be associated with the same base station. Also, the first second and third operator environments are provided as illustrative examples. The multiple operator network environment 200 can have any number of operator environments.

In embodiments, the multiple operator network environment 200 may further comprise a RBSSDL 270 (Multi-Operator Real Base Station Security Distributed Ledger). The RBSSDL is configured to store information associated with each operator environment. The RBSSDL may be configured to store information related to the FBSIF of each operator environment including the FBS List 230, RBS List 240, and report tracker 220 of each operator environment. In embodiments, the RBSSDL 270 may store Certificate ID, Base Station ID, Cell Sector Information, Base Station LAT/LONG, Cryptographic Signature, and 5G Network Connection Information for each of the operator environments connected to or associated with the RBSSDL. All of this information may be organized and stored on the RBSSDL. Each operator environment may be communicatively coupled to the RBSSDL. This allows each operator environment access to the information stored on the RBSSDL, so that each operator environment may benefit from information associated with and determined by the FBSIFs associated with other operator environments. In additional embodiments, the RBSSDL may also store the encryption and decryption keys associated with the base stations and FBSIFs of the distinct operator environments. The encryption and decryption keys may be asymmetric keys, symmetric keys, or any other form of cryptographic key associated with Public Key Infrastructure (PKI). The RBSSDL may be associated with a 5G Network. Additionally, each of the operator environments may also be associated with a 5G Network.

In embodiments, a private key can be employed to generate one or more associated public keys, encrypt data that can only be decrypted by an associated public key, and/or digitally sign data. In additional embodiments, a public key can be employed to decrypt data encrypted by an associated private key, encrypt data that only the private key can decrypt, and/or digitally authenticate a digital signature generated by an associated private key. In embodiments, the verification message sent by or received from a base station must be digitally signed by the private key associated with the sending base station. The receiving computer system or false base station identification system must then determine that the verification message was sent by or received from a real base station based on decrypting the digital signature using a private key.

Figure 3:
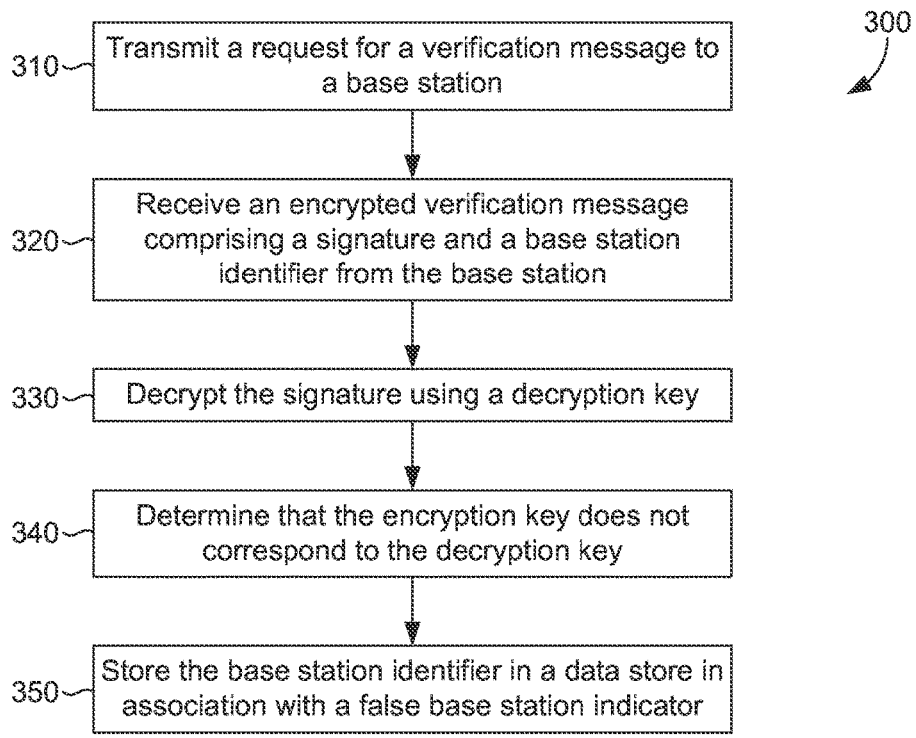
FIG. 3 illustrates an example method for identifying a false base station.

FIG. 3 illustrates a computer-implemented method 300 for detecting false base stations. The operations of the method presented below are intended to be illustrative. In some implementations, the method may be accomplished with one or more additional operations not described, or without one or more of the operations discussed. Additionally, the order in which the operations of the method 300 are illustrated in FIG. 3 and described below is not intended to be limiting unless expressly discussed. Additionally, method 300, of FIG. 3 may be performed via one or more of the components and component interactions of previously described FIG. 1 and FIG. 2, and later described FIG. 5. As such, the method 300 discussed briefly for brevity, though it will be understood that the previous discussion can be applicable to aspects of the method of FIG. 3. In various embodiments, one or more non-transitory computer-readable storage media having computer-readable instructions or computer-readable program code portions embodied thereon, for execution via one or more processors, may be executed to implement and/or perform one or more of the method 300 shown in FIG. 3. For example, computer-readable instructions or computer-readable program code portions can specify the performance of the method 300, can specify a sequence of steps of the method 300, and/or can identify particular component(s) of a software and/or hardware for performing one or more of the steps of the method 300, in embodiments. The computer-readable instructions or computer-readable program code portions can correspond to an application plugin or an application programming interface (API), in some embodiments. In one embodiment, the plugin or API can implement and/or perform the method 300. As discussed below, the method 300 can be performed using any and all of the software, hardware, modules, and/or component(s), shown in FIGS. 1, 2, and 5.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

FIG. 3 illustrates method 300, in accordance with one or more implementations. Method 300 may be implemented as a computer-implemented method. In further embodiments, method 300 may be implemented by a computer system having one or more computer storage media storing computer-useable instructions. In even further embodiments, method 300 may be implemented by non-transitory computer-readable media having computer-executable instructions embodied thereon that, when executed, perform a method.

In various embodiments, the method 300 for detecting false base stations may comprise, at block 310, transmitting, by a computing device, a request for a verification message to a base station. In embodiments, the verification message may be sent periodically at periodic intervals, at predetermined times, in response to detecting a new base station, or at any other periodic, predetermined, or reactive times.

At block 320, an encrypted verification is received by the computing device from the base station. In embodiments, the encrypted verification message comprises a base station identifier and a signature encrypted using an encryption key associated with the base station. In further embodiments, the encrypted verification message also comprises a nonce. In embodiments, this may be a timestamp. In further embodiments, the encrypted verification method may also comprise a certificate which may be used in verifying the base station In embodiments, the signature may be encrypted using asymmetric encryption. In additional embodiments, the signature may be encrypted using symmetric encryption. In embodiments, the computing device may be a false base station identification system.

At block 330, the computing device decrypts the signature included in the encrypted verification message utilizing a decryption key associated with the computer system. At block 340, the computing device determines that the encryption key does not correspond to the decryption key, based on the decrypted signature. In embodiments, the computing device may be associated with a private key that is used to generate a number of public keys. These public keys are subsequently distributed to a plurality of base stations associated with the computing device. When the computer system transmits the request for a verification message, the computing device may indicate that the signature of the verification message must be encrypted using the previously distributed public keys. In additional embodiments, the false base station identification system or user computing device may have a private key which is cryptographically linked or associated with a plurality of public keys. In such embodiments, decrypting a message containing a signature not associated with a cryptographically linked public key indicates that the transmitter of such message is a false base station.

If a base station is a real base station, it will be able to encrypt the signature of the verification message using the distributed public key that is associated with the computer system's private key. If a base station is a false base station, it will be unable to encrypt the verification message correctly. Therefore, when the computer system decrypts the verification signature of the verification message from a real base station, the resulting decrypted signature will be a verifiable verification message. When the computer system decrypts the signature of the verification message received from a false base station, the resulting decrypted signature will be recognized as originating from a false base station. In further embodiments, rather than decrypting the false base station message, it may be determined that the decryption process failed. This failure may also indicate that the base station is a false base station.

In additional embodiments, such as with symmetric cryptography, the same key may be used to both encrypt and decrypt the signature in the verification method. In such embodiments, the symmetric key is used to encrypt the signature of a verification message. This message is then transmitted to the false base station identification system. The false base station identification system then uses the symmetric key to determine whether or not the verification message was transmitted by a false base station or a real base station.

At block 350, based on determining that the encryption key does not correspond to the decryption key, the computing device stores the base station identifier in a data store in association with a false base station indicator. In embodiments, the data store may be a distributed ledger. In further embodiments, a second encrypted verification message may be received, by the computing device, from a second base station. The second encrypted verification message comprises a second base station identifier and a second signature encrypted based on a second encryption key associated with the second base station. It is determined that the second base station has been previously stored in the data store in association with the false base station indicator. In further embodiments, the computer system may make this determination as soon as it receives a verification message.

Once a verification message is received, the base station identifier associated with the message may be immediately checked against the base station identifiers stored in the data store. If the computer system determines that this base station identifier has already been stored in association with either a real or false base station identifier, the computer system may halt the process. This determination would save processing time and memory. Once it is determined that a base station identifier is already in the data store, the computer system no longer needs to decrypt the verification message, nor store its associated base station identifier.

Figure 4:
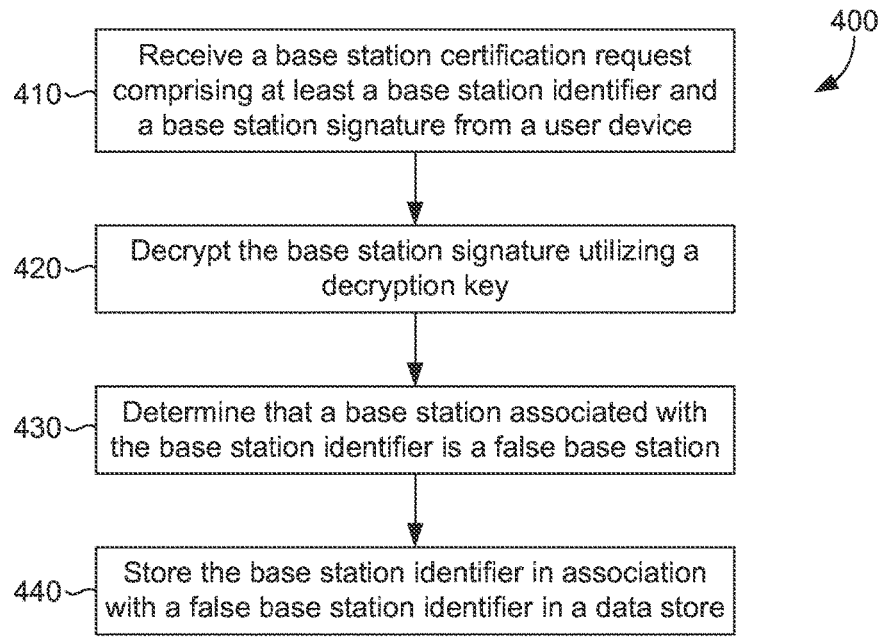
FIG. 4 illustrates another example method for identifying a false base station.

Referring to FIG. 4, a method 400 is illustrated in accordance with one or more implementations. Method 400 may be implemented as a computer-implemented method. In further embodiments, method 400 may be implemented by a computer system having one or more computer storage media storing computer-useable instructions. In even further embodiments, method 400 may be implemented by non-transitory computer-readable media having computer-executable instructions embodied thereon that, when executed, perform a method.

At block 410, a base station certification request comprising at least a base station identifier and a base station signature is received from a user device, by a false base station identification system. The base station certification request comprises at least a base station identifier, and a base station signature encrypted utilizing an encryption key. In embodiments, the false base station identification system may be stored in a cloud associated with a network. In further embodiments, the false base station identification system may be stored in a data store associated with the network. In embodiments, the base station certification request may be received by the user computing device from the base station. For example, a user computing device may be configured to request a verification message from any base station in communication with the user computing device. As such, when a user computing device connects to a base station for the first time, it may request a verification message. Once received, the user computing device may then forward the verification to the false base station identification system. Verification messages may be forwarded to the false base station identification system immediately upon receipt of the verification method. In additional embodiments, the user computing device may store multiple verification messages. Each verification message may then be forwarded based on the number of stored verification messages reaching a certain threshold. In additional embodiments, the base station certification request may further comprise a nonce.

At block 420, the base station signature is decrypted, by the false base station identification system, utilizing a decryption key. In embodiments, the decryption key is retrieved from a database associated with the false base station identification system. In additional embodiments, the decryption key is replaced with a new decryption key at a predetermined interval.

At block 430, it is determined, by the false base station identification system, that a base station associated with the base station identifier is a false base station, based on decrypting the base station signature. In additional embodiments, it may be determined, by the false base station identification system, that a base station associated with the base station identifier is a real base station, based on decrypting the base station signature.

At block 440, the base station identifier is stored, by the false base station identification system, in a data store in association with a false base station indicator. In embodiments in which it is determined that a base station is determined to be a real base station, the base station identifier is stored, by the false base station identification system, in a data store in association with a real base station indicator. In embodiments, the false base station identification system may determine that the base station identifier has been previously stored in the data store in association with the false base station identifier. The false base station identification system may remove any duplicates stored in the data store in order to conserve memory.

In embodiments, the false base station identification system may transmit a notification to the user computing device, wherein the notification is configured to block the user computing device from receiving communications from the base station. The notification may be further configured to facilitate connection of the user computing device with a real base station. In embodiments, the false base station identification system may also transmit a notification to the user computing device, wherein the notification indicates that the base station is a false base station. In embodiments, the notification may have information related to the location of the false base station, the time at which the user computing device connect to the false base station, or any other relevant information.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated. In aspects, the computing device 500 may be a UE, WCD, or other user device, capable of two-way wireless communications with an access point. Some non-limiting examples of the computing device 500 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 510 that directly or indirectly couples the following devices: memory 512, one or more processors 514, one or more presentation components 516, input/output (I/O) ports 518, I/O components 520, and power supply 522. Bus 510 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 520. Also, processors, such as one or more processors 514, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. Memory 512 may be removable, non-removable, or a combination thereof. Exemplary memory includes solid-state memory, hard drives, optical-disc drives, etc. Computing device 500 includes one or more processors 514 that read data from various entities such as bus 510, memory 512 or I/O components 520. One or more presentation components 516 presents data indications to a person or other device. Exemplary one or more presentation components 516 include a display device, speaker, printing component, vibrating component, etc. I/O ports 518 allow computing device 500 to be logically coupled to other devices including I/O components 520, some of which may be built in computing device 500. Illustrative I/O components 520 include a microphone, joystick, game pad, satellite dish, scanner, printer, wireless device, etc.

Radio 524 represents a radio that facilitates communication with a wireless telecommunications network. In aspects, the radio 524 utilizes one or more transmitters, receivers, and antennas to communicate with the wireless telecommunications network on a first downlink/uplink channel. Though only one radio is depicted in FIG. 5, it is expressly conceived that the computing device 500 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA 1XA, GPRS, EvDO TDMA, GSM, WiMax technology, LTE, LTE Advanced, 5G and the like. Radio 524 might additionally or alternatively facilitate other types of wireless communications including Wi-Fi, WiMAX, LTE, or other VoIP communications. As can be appreciated, in various embodiments, radio 524 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims herein. Embodiments of the technology have been described with the intent to be illustrative rather than restrictive. Alternative embodiments will become apparent to readers of this disclosure after and because of reading it. Alternative methods of implementing the aforementioned subject matter may be performed without departing from the scope of the claims herein. Certain features and sub-combinations are of utility and may be employed without reference to other features and sub-combinations, which is contemplated as within the scope of the claims.

The invention claimed is:

1. A computer-implemented method for detecting false base stations, the computer-implemented method comprising:

transmitting, by a computing device, a request for a verification message to a base station;

receiving, by the computing device, an encrypted verification message from the base station, the encrypted verification message, comprising a base station identifier and a signature encrypted using an encryption key associated with the base station;

decrypting, by the computing device, the signature included in the encrypted verification message utilizing a decryption key associated with the computing device;

based on decrypting the signature, determining, by the computing device, that the encryption key does not correspond to the decryption key; and based on determining that the encryption key does not correspond to the decryption key, storing, by the computing device, the base station identifier in a data store, wherein the base station identifier is stored in association with a false base station indicator.

2. The computer-implemented method of claim 1, wherein the encrypted verification message further comprises a nonce.

3. The computer-implemented method of claim 2, wherein the nonce is a timestamp.

4. The computer-implemented method of claim 1, wherein the signature is encrypted using asymmetric encryption.

5. The computer-implemented method of claim 1, wherein the signature is encrypted using symmetric encryption.

6. The computer-implemented method of claim 1, wherein the request for the verification message is transmitted periodically.

7. The computer-implemented method of claim 1, further comprising:

receiving, by the computing device, a second encrypted verification message from a second base station, the second encrypted verification message comprising a second base station identifier and a second signature encrypted based on a second encryption key associated with the second base station; and determining that the second base station has been previously stored in the data store in association with the false base station indicator.

8. A computer system comprising:

one or more processors, and one or more computer storage media storing computer-useable instructions that, when used by the one or more processors, cause the one or more processors to:

receive, by a false base station identification system, a base station certification request from a user computing device, wherein the base station certification request comprises at least a base station identifier, and a base station signature encrypted utilizing an encryption key;

utilizing, by the false base station identification system, a decryption key associated with the false base station identification system, decrypt the base station signature;

based on decrypting the base station signature, determine, by the false base station identification system, that a base station associated with the base station identifier is a false base station; and store, by the false base station identification system, the base station identifier, in association with a false base station indicator in a data store.

9. The computer system of claim 8, further comprising:

transmit a notification to the user computing device, wherein the notification is configured to block the user computing device from receiving communications from the base station.

10. The computer system of claim 8, further comprising:

transmit a notification to the user computing device, wherein the notification indicates that the base station is a false base station.

11. The computer system of claim 8, further comprising:

determine that the base station identifier has been previously stored in the data store in association with the false base station indicator.

12. The computer system of claim 11, further comprising:

remove the base station identifier from the data store.

13. The computer system of claim 8, wherein the base station certification request was received by the user computing device from the base station.

14. The computer system of claim 8, wherein the decryption key is retrieved from a database associated with the false base station identification system.

15. The computer system of claim 8, wherein the base station certification request further comprises a nonce.

16. One or more non-transitory computer-readable media having computer-executable instructions embodied thereon that, when executed by a computing device, perform a method comprising:

transmitting, by the computing device, a request for a verification message to a base station;

receiving, by the computing device, an encrypted verification message from the base station, the encrypted verification message comprising at least a base station identifier and a signature encrypted using an encryption key associated with the base station;

decrypting, by the computing device, the signature utilizing a decryption key associated with the computing device;

based on decrypting the signature, determining, by the computing device, that the encryption key does correspond to the decryption key; and based on determining that the encryption key corresponds to the decryption key, storing, by the computing device, the base station in a data store, wherein the base station identifier is stored in association with a real base station indicator.

17. The one or more non-transitory computer-readable media of claim 16, wherein the decryption key is replaced with a new decryption key at a predetermined interval.

18. The one or more non-transitory computer-readable media of claim 16, wherein the encrypted verification message further comprises a nonce.

19. The one or more non-transitory computer-readable media of claim 18, wherein the nonce is a timestamp.

20. The one or more non-transitory computer-readable media of claim 16, wherein the encrypted verification message is encrypted using asymmetric encryption.

* * * * *